(12) United States Patent
Freudendahl

(10) Patent No.: US 7,789,431 B2
(45) Date of Patent: Sep. 7, 2010

(54) PIPE COUPLING

(75) Inventor: Erling A. Freudendahl, Galten (DK)

(73) Assignee: Aage V. Kjaers Maskinfabrik A/S, Galten (DK)

( * ) Notice: Subject to any disclaimer, the term of this patent is extended or adjusted under 35 U.S.C. 154(b) by 511 days.

(21) Appl. No.: 11/885,437

(22) PCT Filed: Mar. 2, 2006

(86) PCT No.: PCT/DK2006/000124

§ 371 (c)(1),
(2), (4) Date: Aug. 31, 2007

(87) PCT Pub. No.: WO2006/092144

PCT Pub. Date: Sep. 8, 2006

(65) Prior Publication Data

US 2008/0157522 A1   Jul. 3, 2008

(30) Foreign Application Priority Data

Mar. 4, 2005  (DE) ............................... 2005 00337

(51) Int. Cl.
*F16L 33/10* (2006.01)
(52) U.S. Cl. ................ 285/104; 285/339; 285/341; 285/368; 285/369
(58) Field of Classification Search ................ 285/104, 285/105, 337, 341, 342, 343, 339, 369, 368
See application file for complete search history.

(56) References Cited

U.S. PATENT DOCUMENTS

| 2,738,995 | A | * | 3/1956 | Risley et al. ................ 285/342 |
| 5,314,213 | A |   | 5/1994 | Heister et al. |
| 5,476,292 | A |   | 12/1995 | Harper |
| 6,106,029 | A | * | 8/2000 | DeMore et al. ............. 285/322 |
| 6,481,755 | B2 | * | 11/2002 | Hulsebos et al. ............ 285/104 |
| 6,843,514 | B2 | * | 1/2005 | Rex et al. .................... 285/341 |

FOREIGN PATENT DOCUMENTS

| EP | 0 794 378 A2 | 9/1997 |
| EP | 0 974 780 A1 | 1/2000 |
| EP | 1 138 999 A1 | 10/2001 |
| GB | 2 167 146 A | 5/1986 |
| GB | 2 345 524 A | 7/2000 |
| GB | 2 379 252 A | 3/2003 |

* cited by examiner

*Primary Examiner*—James M Hewitt
*Assistant Examiner*—Jay R Ripley
(74) *Attorney, Agent, or Firm*—The Nath Law Group; Jerald L. Meyer; Stanley N. Protigal

(57) ABSTRACT

A pipe coupling (1) includes a pipe-shaped sleeve (2) being provided with a protruding flange (4) at least in one end, said flange having a tapering end face (6). The pipe coupling further including an annular gripping ring (13) divided into ring segments (17), an annular resilient sealing ring (12) provided between the flange (4) and the gripping ring (13), a pressure ring (8) and tightening means of the bolt/nut type (26, 27). The pressure ring (8) is divided into a number of separate, mutually interspaced ring segments (10) each provided with an abutment face (9) adapted to displaceably abut the end face (6) of the flange (4). The bolts (26) extend through elongated, radially extending openings (30) in the flange (4) and through clearance holes (32) in the pressure ring segments (10).

10 Claims, 5 Drawing Sheets

PIPE COUPLING

TECHNICAL FIELD

The invention relates to a pipe coupling comprising:

An annular sleeve having at least one insertion end shaped such that a pipe end can be inserted and received therein by being inserted in an insertion direction, said sleeve being provided with a projecting flange having and end face tapering in the insertion direction of the pipe, An annular gripping means having a gripping face facing the outer face of the pipe, An annular, resilient sealing means arranged between the flange and the gripping means when seen in axial direction, An annular pressure means, and Tightening means of the bolt/nut type for pulling the sleeve and the pressure means towards each other for moving the gripping face of the gripping means and the sealing means inwards into tight-gripping and sealing engagement, respectively, with the outer face of the pipe.

BACKGROUND ART

Pipe couplings of the above type are used for sealingly and tension-proof interconnecting pipe or connecting pipe with other equipment, eg. a valve in a pipeline. A typical application is in pipelines for water and gas supply. Pipes for this purpose are grouped according to the nominal diameter DN, but within the same nominal diameter pipes of different materials have different outer diameters. A plastic pipe of DN 100 thus has an outer diameter of 110 mm, a steel pipe has a diameter of 114 mm and a cast-iron pipe has an outer diameter of 118 mm. Pipe couplings of the present type enable the use of the same pipe coupling within a specific DN group.

GB 2 167 146 A discloses a pipe coupling of the above type, wherein a sealing ring and a gripping ring are clamped between the conical end face of a sleeve and a conical end face of a pressure ring to bring the sealing ring and the gripping ring into sealing and gripping engagement, respectively, with the outer face of the pipe. The pressure ring is shaped as an integrally formed, rigid ring.

Furthermore EP 0 794 378 B1, EP 1 138 999 A1 and EP 0 974 780 B1 all disclose a pipe coupling of the above type, in which a gripping and sealing ring is arranged between the conical end face of a sleeve flange and the conical face of a pressure ring. The gripping and sealing ring is forced into tight-gripping and sealing engagement with the outer surface of the pipe when the pressure ring is pulled towards the flange of the sleeve. The gripping and sealing ring is formed of a large number of wedged-shaped abutting elements. The pressure ring is an integrally formed, rigid ring. Particularly due to the large number of elements of the gripping and sealing ring, the pipe coupling is complex and expensive to manufacture.

DISCLOSURE OF THE INVENTION

The object of the present invention is to provide a pipe coupling of the above type which is simple and inexpensive to manufacture and install in a pipe system and which may be used for pipes of different diameters and different materials while obtaining a tight and tension-proof joint allowing for some angular variation or angle deviation in relation to an accurate axial alignment of the sleeve of the pipe coupling and the pipe end inserted therein.

The pipe coupling according to the invention is characterised in that the pressure means is divided into a number of separate segments and provided with an abutment face adapted to displaceably abut the end face of the flange and shaped such that by axially displacing the pressure means in relation to the flange the segments of the pressure means are moved inwardly towards the outer face of the pipe, that the bolts extend through elongated, radially extending openings in the flange and that means are provided to substantially retain the bolts radially in relation to the pressure means.

When the bolts are tightened, the ring segments of the pressure means are moved inwards, the abutment face sliding inwards along the end face of the flange. As a result, the sealing means and the gripping means are forced inwards into sealing and tight-gripping, respectively, engagement with the outer face of the pipe. Simultaneously with the inward movement of the ring segments of the pressure means, the bolts are moved radially inwards, the openings in the flange allowing this movement. As a result, by means of the segmental pressure means the pipe coupling is provided with improved stability when subjected to pressure, as the distance between the outer face of the pipe and the ring segments of the pressure means is substantially the same regardless of the outer pipe diameter and as the distance between the bolts and the outer face of the pipe also is substantially the same regardless of the outer pipe diameter. In addition to being comparatively inexpensive and simple to manufacture the pipe coupling according to the invention is easy to install and allows for some angular variation or angle deviation of the pipes in relation to the sleeve due the segmental pressure means.

The radial openings of the flange may be slots extending to the outer periphery of the flange.

Furthermore according to the invention the annular gripping means may be integrally formed with the annular pressure means and thus also be divided into ring segments.

Moreover, according to the invention the annular gripping means may be divided into a number of separate, mutually interspaced gripping ring segments.

According to another embodiment of the invention it is preferred that the ring segments of the gripping means are secured to the sealing means. The securing may be provided by means of a form-fitting connection or a frictional connection between the sealing means and the gripping means segments, by an adhesive connection optionally provided in connection with the moulding of the elastomeric sealing means or by other means.

According to an advantageous embodiment of the invention the gripping means is arranged such in relation to the pressure means that the gripping means segments bridge over the gaps between the segments of the pressure means. The gripping means segments thereby advantageously also abut the sealing means in the gaps between the segments of the pressure means.

For obtaining the desired positioning of the gripping means segments in relation to the sealing means and the pressure means segments the sealing means may be provided with projections extending into the gaps between the pressure means segments.

For ensuring an optimum engagement with and sealing against the outer face of the pipe, the number of gripping means segments may outnumber the number of pressure means segments. The number of gripping means segments may thus be a multiple of the number of pressure means segments.

The end face of the flange may be conically shaped and have an angle of inclination being less than 45° in relation to the axis of the pipe coupling or the sleeve. The abutment face of the gripping means may also be conical and have an angle of inclination corresponding to the angle of inclination of the end face. The end face of the flange and the abutment face of the pressure means may, however, also be of any other shape allowing for the intended inward movement of the pressure means when the bolts are tightened. The end face and optionally also the abutment face may thus be arched or curved.

According to another embodiment of the invention in its radially inner face the pressure means is provided with a recess receiving the annular gripping means, and the annular gripping means has an radially outer face adapted to abut a wall of the recess such that the gripping means segments are moved towards the outer face of the pipe when the pressure means is moved axially in relation to the annular gripping means.

The annular gripping means may be substantially wedge-shaped in a cross-sectional view and its radially outer face may have an inclination of less than 45°, preferably less than 30°, in relation to the axis of the pipe coupling.

According to yet another embodiment of the invention the pressure means segments are provided with through-going holes to receive the bolts so that the bolts are substantially retained in a radial direction.

Furthermore, according to an embodiment of the invention, the bolts may be received in the gaps between the pressure means segments.

As a result, a clamping member provided with a bolt hole may bridge over each gap between the segments of the pressure means, said clamping member having conical faces co-acting with corresponding conical faces on two adjacent pressure means segments so as to force the pressure means segments towards each other during tightening of the bolts.

Moreover, according to an embodiment of the invention, adjacent pressure means segments in lateral faces facing each other may be provided with a recess and an engaging projection, respectively, said projection being displaceable in circumferential direction in said recess.

As a result, a segment transfers its movement to the two adjacent segments when it is tightened by means of a bolt and moves axially and inwardly towards a pipe end. Consequently, it is only necessary to tighten every other segment by means of bolts, whereby the number of bolts may advantageously be halved and the securing of a pipe end in the pipe coupling is accelerated and facilitated.

Furthermore, according to an embodiment of the invention, at one end the bolts may be pivotally connected in radial direction with the sleeve at points being axially spaced apart from the flange of the sleeve.

When the bolts are tightened, they are pivoted inwards towards the sleeve about the pivot point at the inward movement of the pressure means segments. This embodiment of the invention is particularly suitable when only one pipe end is to be secured to the coupling or when two pipe ends forming an angle are to be secured to the pipe coupling. In the latter instance, radially pivotal bolts are naturally associated with each end of the pipe coupling.

Finally, it should be mentioned that the gripping face of the gripping means advantageously may be provided with teeth for engagement in the outer face of the pipe.

BRIEF DESCRIPTION OF THE DRAWINGS

The invention is explained in detail below with reference to the drawings, in which.

BEST MODE(S) FOR CARRYING OUT THE INVENTION

Figure 1:
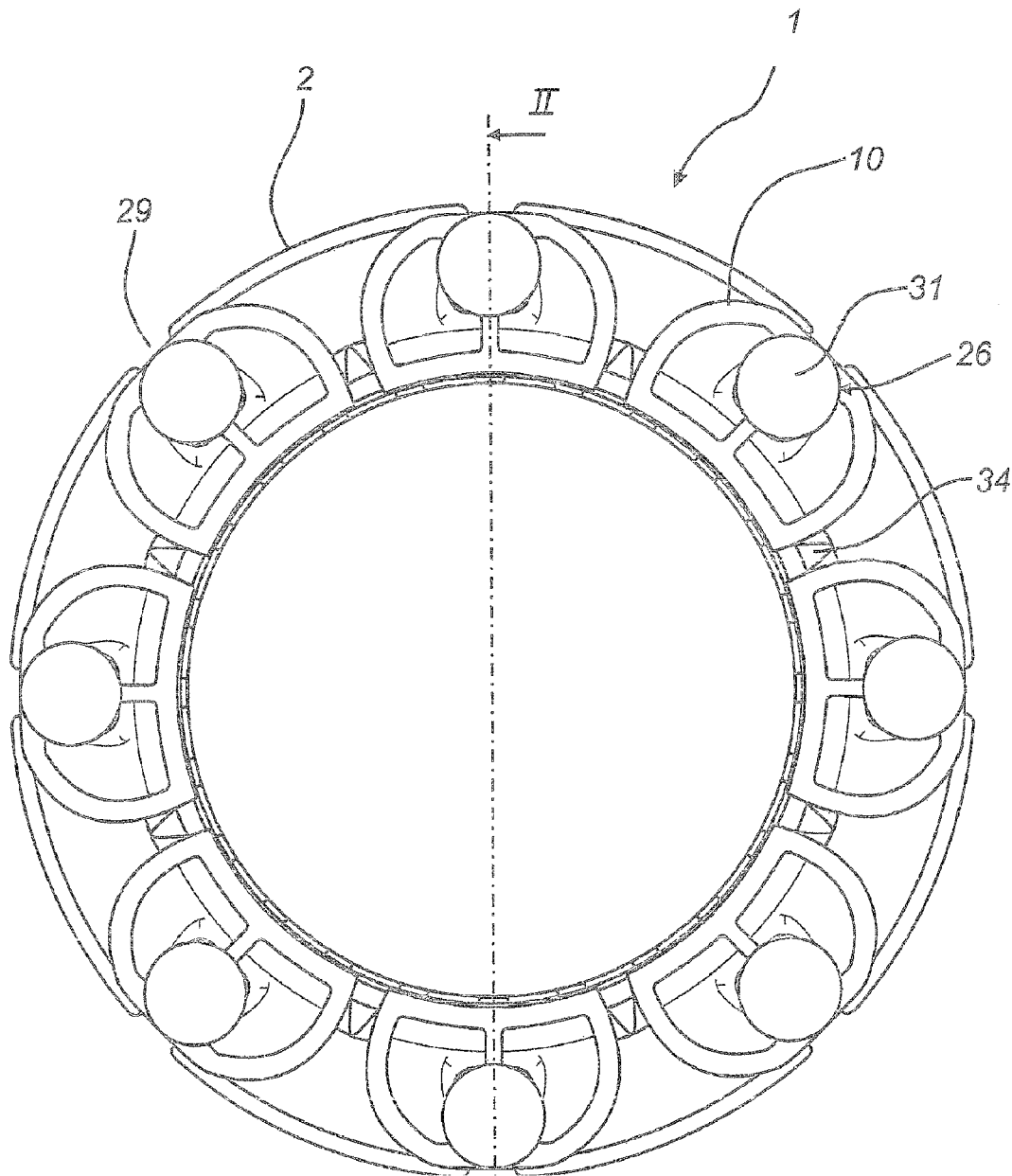
FIG. 1 is an end view of a pipe coupling according to the invention for connecting two pipes.
Figure 2:
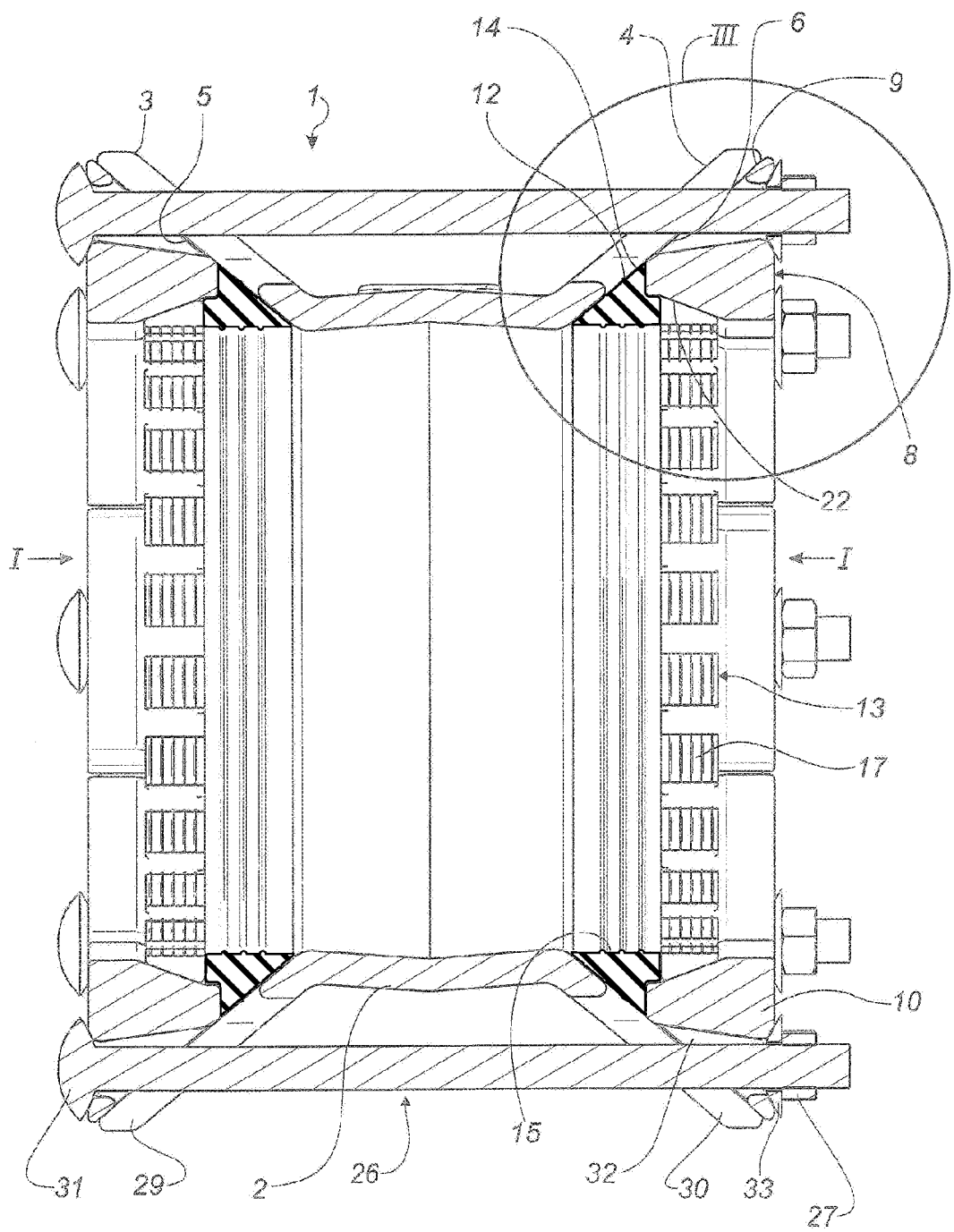
FIG. 2 is an axial, sectional view through the pipe coupling in FIG. 1 along the line II-II.

The embodiment of a pipe coupling 1 according to the invention shown in FIGS. 1 to 4 is adapted to substantially co-axially connect two pipes. The pipe coupling 1 includes a sleeve 2 being provided with an outwardly extending flange 3,4 at opposing ends, said flanges each having an end face 5, 6 tapering in the insertion direction of a pipe end which has been inserted and received in the opposing ends of the sleeve. In FIG. 2, the insertion direction of the pipe ends into the sleeve ends are indicated by means of the arrows I.

As it is appears from FIG. 2, the pipe coupling 1 is shaped substantially symmetrical about the central plane of the sleeve 2. In the description below reference is thus primarily made to the sleeve half shown on the right-hand side of FIG. 2. At each end, the pipe coupling further includes a pressure ring 8 provided with an abutment face 9 facing the end face 6 of the flange 4 in displaceable abutment therewith.

The pressure ring 8 is divided into a number of pressure ring segments 10 mutually spaced apart in circumferential direction. In the shown embodiment the pressure ring consists of eight pressure ring segments, as shown in FIG. 1. In the shown embodiment the end face 6 of the flange 4 is conically shaped and the abutment face 9 of the pressure ring has a corresponding conical shape.

The pipe coupling 1 further includes a sealing ring 12 arranged between the flange 4 of the sleeve 4 and the pressure ring 8 when seen in axial direction and a gripping ring 13.

In the shown embodiment the sealing ring 12 is substantially wedge-shaped and has a first sealing face 14 adapted to sealingly abut the conical end face 6 of the flange 4. The sealing ring 12 further has a radially inner sealing face 15 adapted to abut the outer face of a pipe end inserted into the pipe coupling, as described in detail below.

Figure 3:
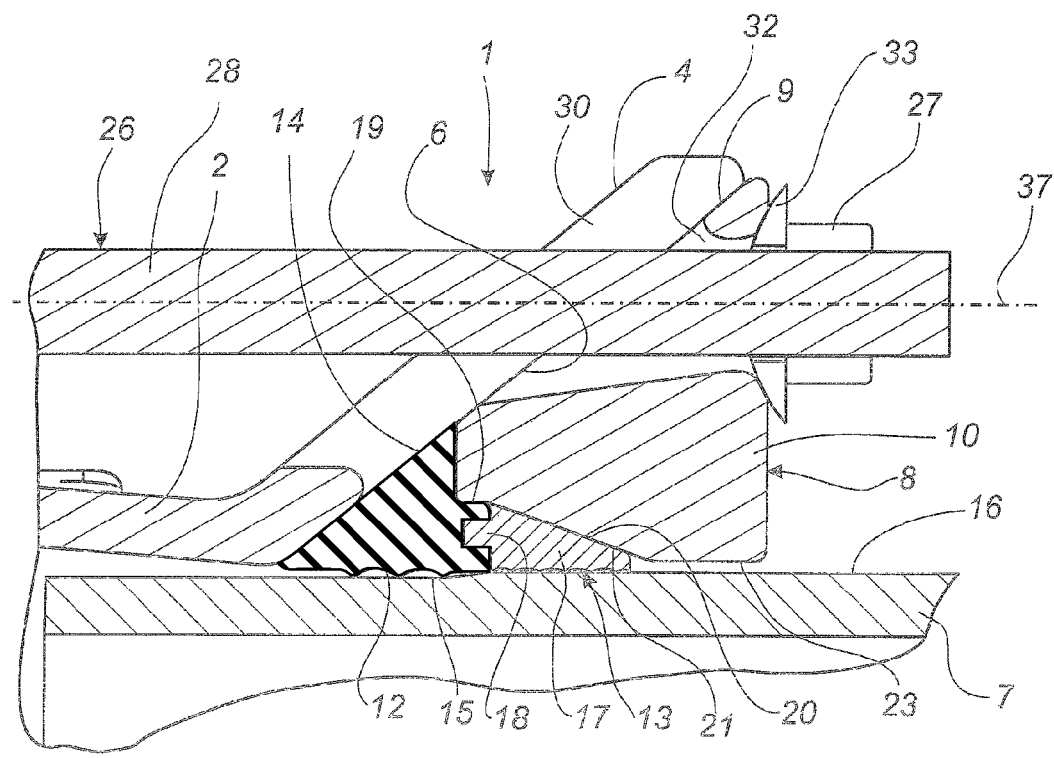
FIG. 3 is a diagrammatic, partial view of the pipe coupling according to the invention substantially corresponding to the part III in FIG. 2, and where a pipe of the largest diameter to which the pipe coupling is intended is secured to the respective end of the pipe coupling.
Figure 4:
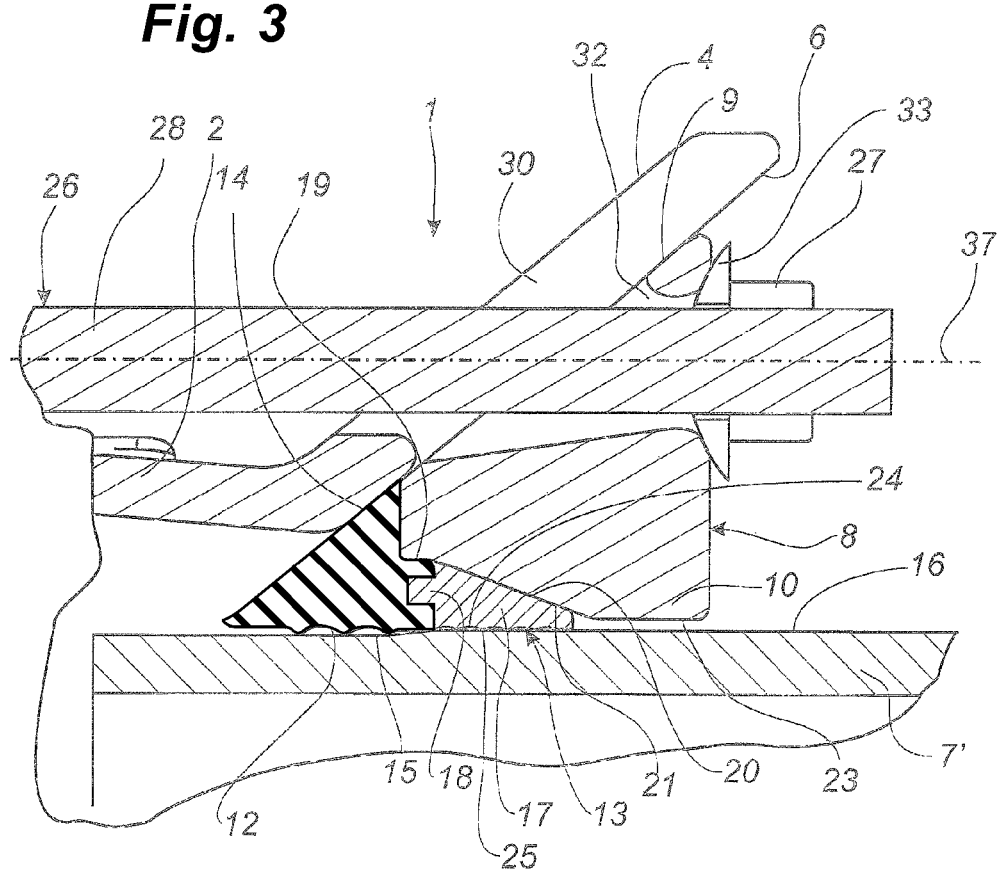
FIG. 4 is a partial view corresponding to FIG. 3 and where a pipe of the smallest outer diameter to which the pipe coupling is intended is secured to the respective end of the pipe coupling.

The gripping ring 13 comprises a number of gripping ring segments 17 mutually spaced apart when seen in circumferential direction and arranged between the sealing ring 12 and the pressure ring 8 when seen in axial direction. The segments 17 of the gripping ring 13 are connected with the sealing ring 12 by means of axial bosses 18 on the gripping ring segments 17, said bosses extending into corresponding recesses 19 in the sealing ring, as shown in FIGS. 3 and 4.

In a cross-sectional view the segments 17 of the gripping ring 13 are substantially wedge-shaped and provided with a radially outer conical face 20 abutting a corresponding radially inner face 21 of a recess 22 in the radially inner face 23 of the pressure ring 8. Furthermore, the segments 17 of the gripping ring 13 each has a radially inner gripping face 24 provided with teeth 25.

The shown pipe coupling further includes a tightening means of the bolt/nut type comprising bolts 26 and nuts 27. The bolt shanks are received in radially extending slots 29, 30 provided in the opposing flanges 3, 4 of the sleeve 2. The bolt shanks 28 further extend through the through-going holes 32 provided in the pressure ring segments 10 of the pressure ring 8.

In the embodiment shown in FIGS. 1-4, the heads 31 of the bolts 26 abut the axially outer end face of the segments of the pressure ring shown on the left-hand side of FIG. 2. In the pressure ring 8 shown on the right-hand side of FIG. 2, the nuts 27 abut the axially outer end face of the pressure ring segments 10 of the pressure ring 8 via a washer 33.

When the bolt/nut connections 26,27 are tightened, the abutment faces of the segments 10 of the pressure ring 8 are forced towards the end faces 5, 6 of the flanges 3,4, whereby the segments 10 of the pressure ring 8 is moved inwards towards the outer face 16 of the pipe. The ring segments 17 of the gripping ring 13 and the sealing face of the sealing ring 12 are thereby also forced inwards towards the outer face 16 of the pipes for respectively sealing and tight-gripping engagement therewith. The inward movement of the pressure ring segments 10 of the pressure ring 8 also forces the bolts 26 inwards, the bolts engaging the through-going holes 32 of the pressure ring segments 10 and being freely movable in the radially slots of the flanges 3, 4.

Finally, with reference to FIGS. 1 and 2 it should be noted that the elastomeric sealing ring 12 is provided with protrusions 34 extending into the gaps between adjacent pressure ring segments 10 and that the gripping ring 13 is provided with segments 17 abutting and forming a bridge between adjacent pressure ring segments 10. The protrusions 34 of the sealing ring 12 thereby ensure a correct positioning of the sealing ring 12 and thus of the segments 17 of the gripping ring 13 in relation to the segments 10 of the pressure ring 8.

FIG. 3 shows the encircled part in FIG. 2 of the pipe coupling shown in FIGS. 1 and 2 and wherein a pipe end 7 has been inserted and secured, said pipe end having the maximum outer diameter of the pipe to which the pipe coupling is intended. FIG. 4 shows a similar part as in FIG. 3, the pipe end 7 inserted into and secured to the coupling end, however, having the smallest diameter to which the pipe coupling is intended. A comparison between FIG. 3 and FIG. 4 shows that the distance between the outer face of the pipe 7, 7' and the radially inner face of the ring segments 10 of the pressure ring 8 is the same at the pipe end 7 with the largest diameter and at the pipe end 7' with the smallest diameter the distance, said distance also being the same in all intermediate pipe diameters. Correspondingly, a comparison between FIG. 3 and FIG. 4 shows that the distance between the axis 37 of the bolts 26 and the outer face of the pipe 7, 7' is the same regardless of the outer diameters of said pipes.

Figure 5:
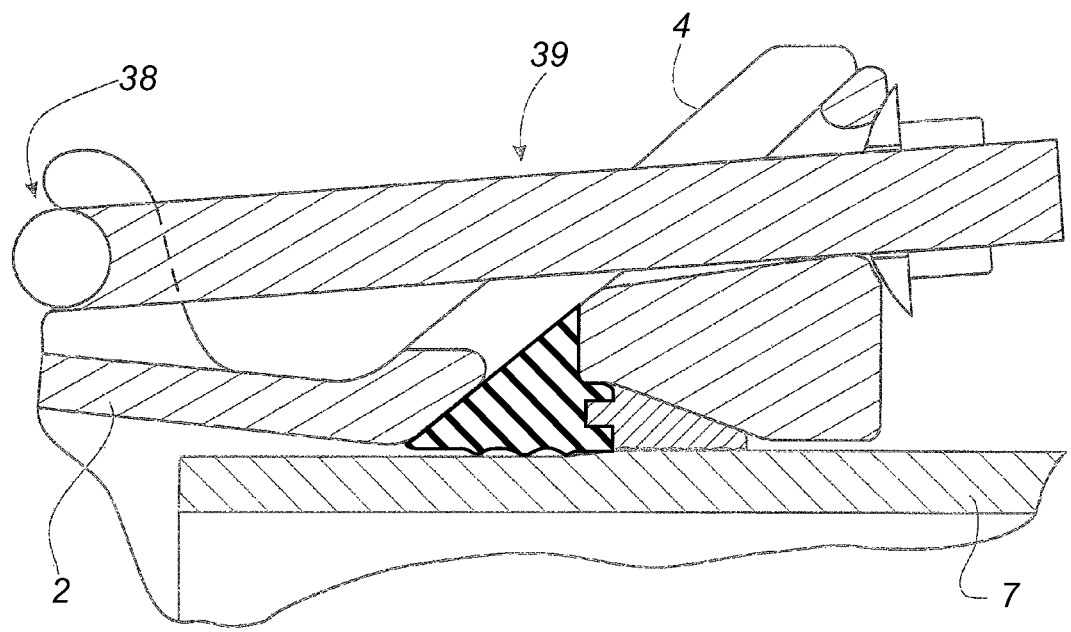
FIG. 5 is a partial view corresponding to FIGS. 4 and 5 of an alternative embodiment of a pipe coupling according to the invention.

Reference is now made to FIG. 5 showing a part corresponding to the one shown in FIGS. 3 and 4 of an alternative embodiment of a pipe coupling according to the invention. In this embodiment one end of the bolt 39 is pivotally connected (at 38) in a manner known per se with the outer face of the sleeve 2 at points axially spaced apart from the flange 4. When a pipe 7 of the maximum outer diameter is received and secured by means of the pipe coupling, the axis of the bolts 39 inclines in relation to the outer face of the pipe as shown in FIG. 5. When securing pipes of a smaller outer diameter than the maximum diameter, the axis of the bolts 39 forms a small angle with outer face of the pipe and at the reception and securing of a pipe of the smallest diameter, the axis of the bolts is substantially parallel to or inclines slightly inwards towards the outer face of the pipe. This embodiment of the invention is particularly suitable when only one pipe end is to be secured to the pipe coupling or when two pipe ends forming an angle, eg. a right angle in relation to each other, are to be secured to the pipe coupling. The method of operation of the pipe coupling shown in FIG. 5 corresponds to the embodiment described above and is thus not repeated.

Figure 6:
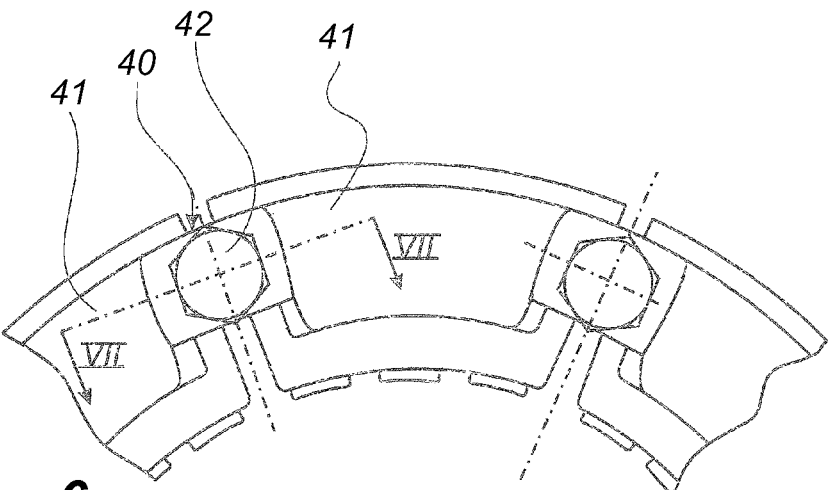
FIG. 6 is a partial end view of an additional embodiment of the pipe coupling according to the invention.
Figure 7:
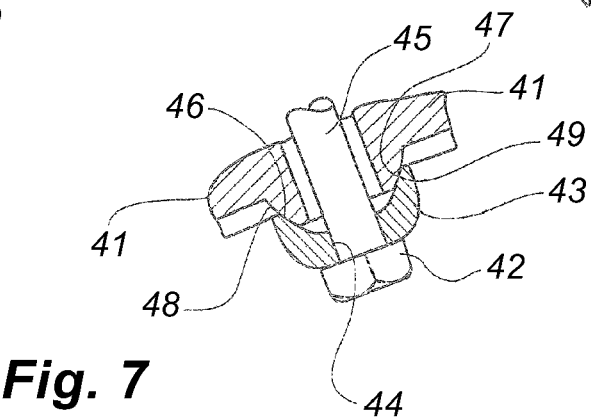
FIG. 7 is a sectional view along the line VII-VII in FIG. 6.

In the part of an additional alternative pipe coupling according to the invention shown in FIG. 6, the bolts 40 are arranged such that they extend through the gaps between two adjacent pressure ring segments. Between the bolt heads 42 and the pressure ring segments a clamping member 43 is arranged having a clearance hole 44 for receiving the shank 45 of the bolts 40. The clamping member 43 overlaps the two adjacent pressure ring segments 41 and is provided with conical faces 46, 47 in the overlapping area, said faces abutting corresponding conical faces 48, 49 provided on the edge portions of the ring segments 41. When tightening the bolts 40, the conical faces 46, 47 of the clamping member 43 co-act with the conical faces 48. 49 of the ring segments to force the pressure ring segments 41 towards each other, as most evident from FIG. 7. At the same time, jointly with the bolts the pressure ring segments are moved inwards as explained above. In connection with the latter embodiment is should be noted that the nut of the bolt connection naturally may abut the clamping member 43 instead of the shown bolt head 42.

Figure 10:
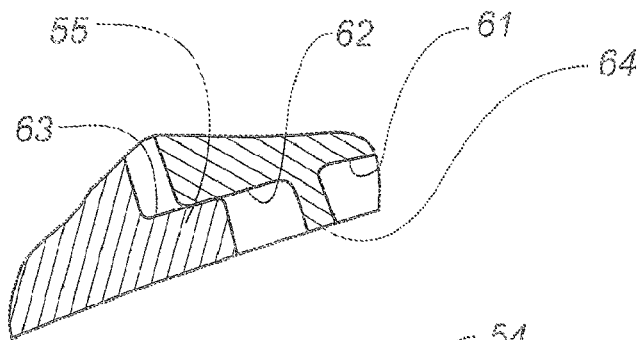
FIG. 10 is a sectional view along the line X-X in FIG. 9.
Figure 9:
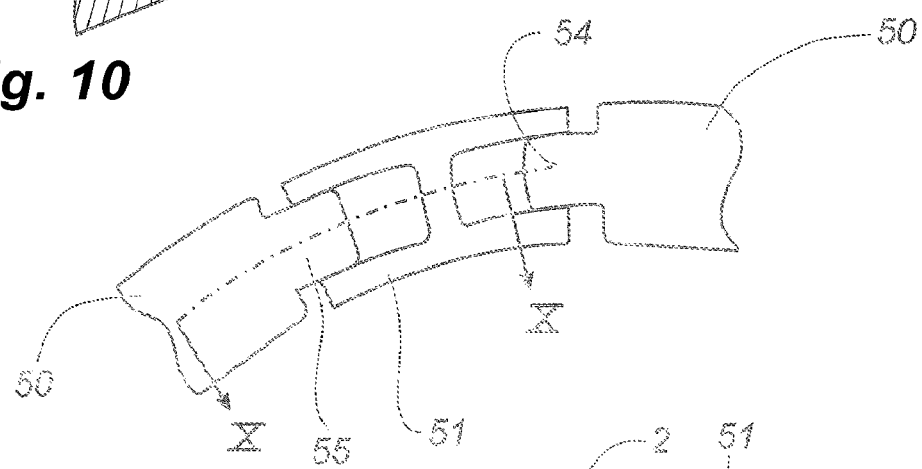
FIG. 9 is an end view of a part of the pipe coupling in FIG. 8 in the direction of the arrow P.
Figure 8:
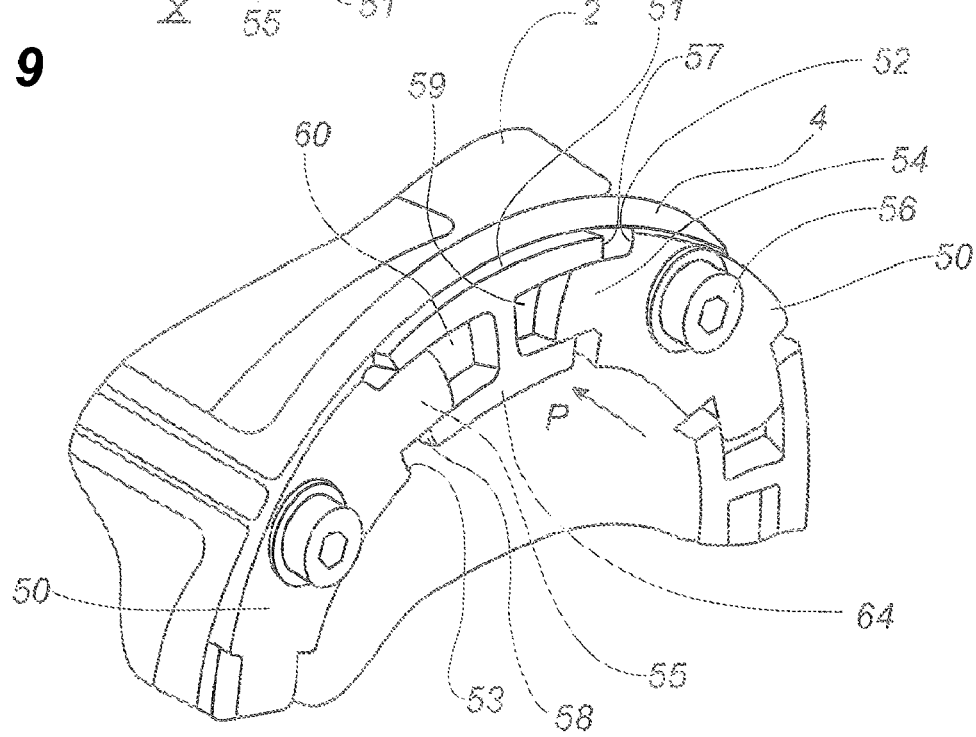
FIG. 8 is a perspective, partial view of another embodiment of the pipe coupling according to the invention.

Reference is now made to FIGS. 8-10 showing another embodiment of a pipe coupling according to the invention. In the previously described embodiments of the pipe coupling, the pressure ring is formed of identical, mutually interspaced pressure ring segments. The pipe coupling shown in FIGS. 8-10 differs therefrom in that its pressure ring is constituted of two different types of pressure ring segments 50, 51 arranged alternately in circumferential direction. The first type of pressure ring segment 50 is provided with a projection 54, 55 in each of its lateral faces 52, 53. Furthermore, in a corresponding manner as the pressure ring segments 10 shown in FIGS. 1-4, the first type of pressure ring segments 50 is provided with a clearance hole for receiving a shank of a bolt 56. The other type of pressure ring segments 51 has lateral faces 57, 58 provided with recesses 59, 60 and wherein the projections 54, 55 of the first type of pressure ring segments 50 are received. Each recess 59, 60 has a bottom 61, 62, against which a radially lower face 63 of a projection 55 abuts. The recesses 59, 60 opens into the end face 64 of the second type of segments 51. The recesses 59, 60 are shaped and dimensioned such in relation to the projections 54, 55 that they are in mutual displaceable engagement when seen in circumference direction, ie. such that the pressure ring formed of the two types of pressure ring segments 50, 51 may assume different diameters. This is further enabled by the mutually facing lateral faces 52, 57; 53, 58 of the pressure ring segments 50, 51 being mutually interspaced.

Before the method of operation of the pipe coupling shown in FIGS. 8-10 is described in detail, it should be noted that except for the above differences as regards the pressure ring segments, the present pipe coupling corresponds to the pipe coupling shown in FIGS. 1-4 and thus includes a sleeve 2 with a flange 4 and a sealing ring with an associated gripping ring consisting of gripping ring segments. It should further be noted that the pressure ring segments 50, 51 correspond to the previously described gripping rings—as regards their outer outline, except for the above differences.

When the bolts 56 are tightened, the first type of pressure ring segments 50 are forced inwards towards the pipe end inserted into the pipe coupling, the inclined abutment faces thereof sliding along the conical end face of the flange 4. The engagement of the projections 54, 55 in the recesses 59, 60 of the second type of the pressure ring segments 51 effects that the second type of pressure ring segments 51 follows the movement of the first type of pressure ring segments 50, the lower face 63 of the projections 54, 55 abutting the bottom 61, 62 of the recesses 59, 60. Consequently, the pressure ring segments 50 and 51 contribute to forcing the sealing ring and the gripping ring into engagement with the pipe end inserted into the respective end of the pipe coupling.

A significant advantage of the pipe coupling shown in FIGS. 8-10 is that half the number of bolts is used in relation to the previously described embodiments of a pipe coupling according to the invention. As a result, the securing of a pipe in the pipe coupling is advantageously facilitated and expedited.

The invention can be modified in many ways without thereby deviating from the scope of the invention. As an example, in the last-mentioned embodiment of the pipe coupling, the recesses of the second type of pressure ring segments may be closed recesses, ie. they do not extend to the end face 64. It should furthermore be noted that in all of the described embodiments it is possible to form the segments of the gripping ring integrally with the segments of the pressure ring.

LIST OF REFERENCE NUMERALS 1 pipe coupling
2 sleeve
3, 4 flange
5, 6 end face of flange
I insertion direction
7 pipe end with maximum outer diameter
7' pipe end with smallest outer diameter
8 pressure ring
9 abutment face
10 pressure ring segment
12 sealing ring
13 gripping ring
14 first sealing face of sealing ring
15 radially inner sealing face of sealing ring
16 outer face of pipe
17 gripping ring segment
18 axial boss on gripping ring segment
19 recess in sealing ring
20 outer conical face of gripping ring
21 inner face of recess
22 recess in pressure ring
23 inner face of pressure ring
24 gripping face of gripping ring
25 teeth
26 bolt
27 nut
28 bolt shank
29, 30 slots
31 bolt head
32 through-going hole
33 washer
34 projections
35 distance between the pressure ring and the outer face of the pipe
37 bolt axis
38 pivot point
39, 40 bolt
41 pressure ring segment
42 bolt head
43 clamping member
44 clearance hole
45 bolt shank
46, 47 conical face of the clamping member
48, 49 conical face of the pressure ring segments
50 first type of pressure ring segment
51 second type of pressure ring segment
52, 53 lateral faces of 50
54, 55 projections
56 bolt
57, 58 lateral faces of 51
59, 60 recesses
61, 62 bottom of 59, 60
63 lower surface
64 end face of 51.

The invention claimed is:

1. A pipe coupling for use with a pipe including a pipe end, the pipe coupling comprising:
an annular sleeve having at least one insertion end shaped such that the pipe end can be inserted and received therein by being inserted in an insertion direction, said sleeve being provided with a projecting flange having an end face tapering radially inwardly in the insertion direction of the pipe,
an annular gripping means having a gripping face that will face the outer face of the pipe when the pipe is inserted,
an annular resilient sealing means provided axially between the flange and the gripping means,
an annular pressure means, and
tightening means comprised of bolts, the tightening means attached to the pressure means, the tightening means forcing the sleeve and the pressure means towards each other so as to move the gripping face of the gripping means and the sealing means inwards into tight-gripping and sealing engagement, respectively, with the outer face of the pipe when the pipe is inserted, wherein the pressure means is divided into a number of separate ring segments and is provided with an abutment face that displaceably abuts the end face of the flange and shaped such that by axially displacing the pressure means in relation to the flange the segments of the pressure means are moved inwardly towards the outer face of the pipe when the pipe is inserted, that the bolts extend through elongated, radially extending openings in the flange and that means are provided to substantially retain the bolts radially in relation to the pressure means so that simultaneously with the inward movement of the ring segments of the pressure means the bolts are moved radially inwards.

2. The pipe coupling according to claim 1, wherein the annular gripping means is integrally formed with the annular pressure means and thus also is divided into ring segments.

3. The pipe coupling according to claim 1, wherein the annular gripping means is divided into a number of separate, mutually interspaced gripping ring segments.

4. The pipe coupling according to claim 3, wherein the segments of the gripping means are secured to the sealing means.

5. The pipe coupling according to claim 3, wherein the gripping means is arranged such in relation to the pressure means that the gripping means segments bridge over the gaps between the segments of the pressure means.

6. The pipe coupling according to claim 1, wherein a radially inner face of the pressure means is provided with a recess receiving the annular gripping means and wherein the annular gripping means has a radially outer face that abuts a wall of the recess such that the gripping means is moved towards the outer face of the pipe when the pipe is inserted and when the pressure means is moved axially in relation to the annular gripping means.

7. The pipe coupling according to claim 1, wherein the segments of the pressure means are provided with throughgoing holes to receive the bolts so that the bolts are substantially retained in radial direction.

8. The pipe coupling according to claim 1, wherein the bolts are received in gaps between the segments of the pressure means.

9. The pipe coupling according to claim 1, wherein adjacent pressure means segments on lateral faces facing each other are provided with a recess and an engaging projection, respectively, said projection being displaceable in circumferential direction in said recess.

10. The pipe coupling according to claim 1, wherein at one end the bolts are pivotally connected with the sleeve at a point spaced apart from the flange.

* * * * *